United States Patent [19]

Polak et al.

[11] 4,235,320

[45] Nov. 25, 1980

[54] RETARDER AND FRICTION BRAKES

[75] Inventors: James C. Polak, Indianapolis; Harry Fackenthal, Indianapolis, Carl A. Lentz, Mooresville; Walter E. Palmer; Robert H. Schaefer, both of Indianapolis, all of Ind.

[73] Assignee: General Motors Corporation, Detroit, Mich.

[21] Appl. No.: 913,969

[22] Filed: Jun. 9, 1978

[51] Int. Cl.³ ............................................. B60K 41/20
[52] U.S. Cl. ................................... 192/4 B; 188/271; 303/113
[58] Field of Search ...................... 192/4 B, 4 A, 4 R; 188/271, 266, 106 F, 181 R, 279; 303/93, 117, 113

[56] References Cited

U.S. PATENT DOCUMENTS

| | | | |
|---|---|---|---|
| 2,946,416 | 7/1960 | Snoy | 192/4 B |
| 3,265,162 | 8/1966 | Botterill | 188/271 |
| 3,283,859 | 11/1966 | Bertram et al. | 188/290 |
| 3,302,755 | 2/1967 | Botterill | 188/271 |
| 3,386,540 | 6/1968 | Horsch et al. | |
| 3,817,585 | 6/1974 | Bowler et al. | 303/113 |
| 3,931,870 | 1/1976 | Memmer | 192/4 B |
| 3,987,874 | 10/1976 | Fuehrer et al. | 192/4 B |

*Primary Examiner*—George H. Krizmanich
*Attorney, Agent, or Firm*—A. M. Heiter

[57] ABSTRACT

A retarder and friction brake system having vehicle service brakes and a shaft brake unit having a hydrodynamic retarder and friction brake. Manual brake controls provide for initial brake apply of the brake unit and then apply of the service brakes or independent apply of the service brakes. The brake unit has a dual chamber, hydrodynamic retarder with opposed bladed stators and a central rotor member having opposed bladed rotors mounted between the stator members for limited axial movement and rotation with a drum fixed to the shaft, and a friction brake having plates located concentrically within the retarder chambers on opposite sides of the rotor and splined to the drum and stators and a brake apply motor. In response to brake demand, the brake controls provide air pressure proportional to brake demand to the brake apply motor and fluid pressure proportional to brake demand and, in a low speed range limited to lower values with decreasing speed, to a brake chamber to provide a release pressure on the brake apply motor and flow through the constant restriction cooling passages in the brake plates to the retarder chambers for retarder braking and pumping through a cooler to provide with increasing speed in the low speed range, decreasing friction braking and increasing retarder braking having a total value proportional to brake demand, and in the higher speed range low friction braking and high retarder braking having a total value proportional to brake demand and increasing in a substantially straight line with increasing speed.

24 Claims, 11 Drawing Figures

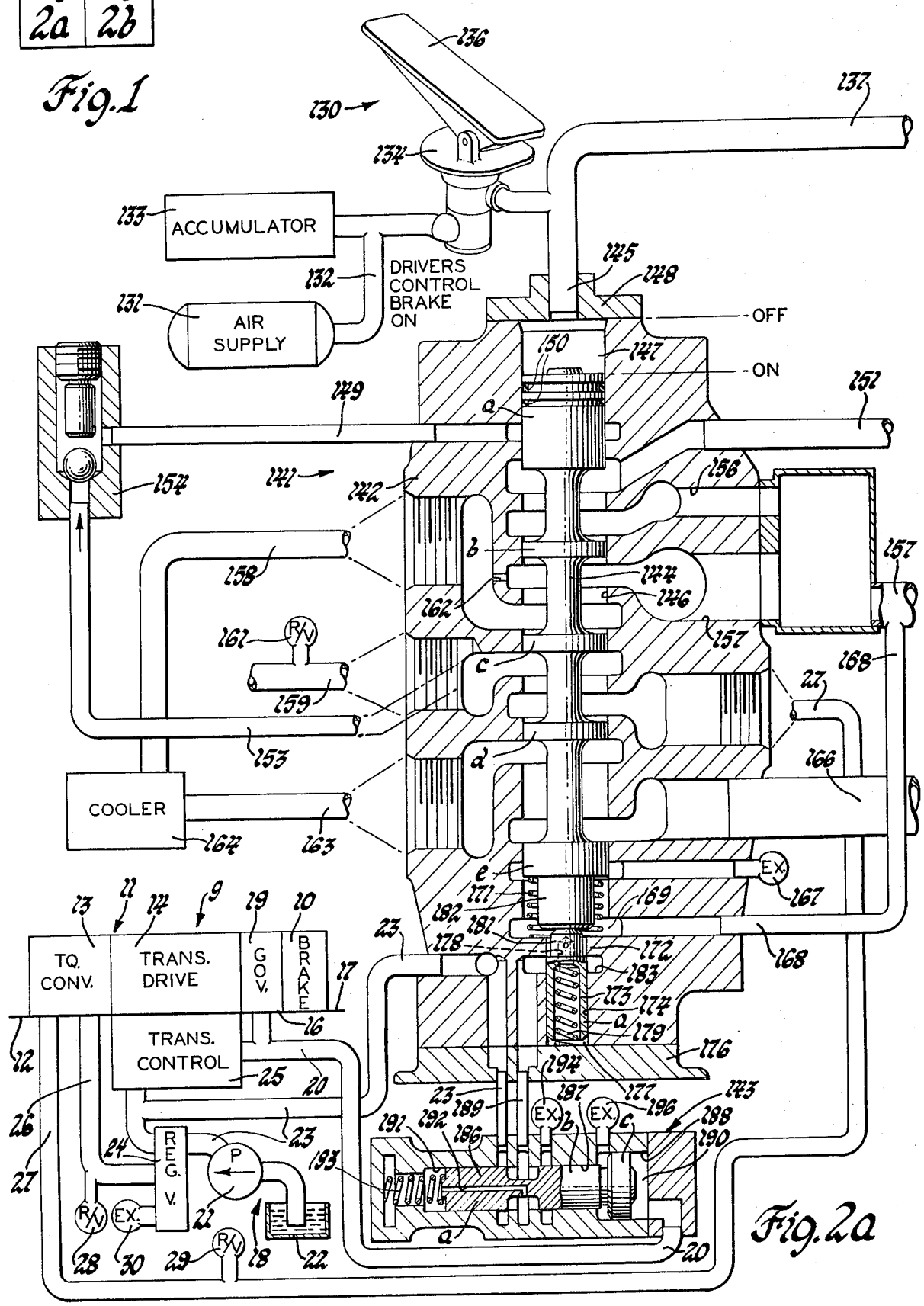

RETARDER AND FRICTION BRAKES

This invention relates to brake systems and particularly brake systems having service brakes and hydrodynamic and friction brakes and controls therefor.

The invention provides an improved brake system having service brakes and a retarder friction shaft brake unit especially for vehicles. The manual controls have a dual brake control providing increasing brake application of the shaft brake unit and then increasing brake application of the service brakes, and a service brake control independently providing increasing application of the service brakes. The dual brake control member, on movement from the brake off position to the maximum dual brake apply position, first provides an increasing shaft brake demand signal and then an increasing service brake demand signal. The dual brake control member first moves from brake off to a maximum shaft brake apply and service brake off position and with further movement, jointly moves the service brake control member from brake off position to maximum service brake position in the maximum dual brake apply position. The service brake control member is independently movable for independent service brake application.

The invention provides an improved shaft brake unit of the friction hydro retarder brake type. The friction brake of the multiplate type is located concentrically within the hydro retarder or hydrodynamic brake in the housing and extends between the side walls of the housing, like an annular partition, to divide the housing into an inner inlet brake chamber and an outer retarder chamber. The friction brake apply motor is on one side wall and engages the brake plates against the other side wall. The friction brake has plates connected to the housing and to the shaft, preferably by a hub. The retarder has a stator, an annular bladed stator, fixed to the housing and a rotor connected to the shaft for rotation with the shaft. Preferably, the retarder is a dual chamber retarder with bladed annular stators on opposite side walls with a rotor member having opposite annular bladed rotors mounted for rotation with the shaft. The rotor member has a plate portion located intermediate the brake plates and axially movable to a limited degree with the brake plates during brake operation. During brake apply, the plates limit rotor movement and during brake release, a stop limits rotor movement.

This invention provides an improved control for the operation of the retarder and for the friction brake of the brake unit. The operator or driver brake control provides a brake demand fluid pressure, which may be hydraulic brake fluid or air depending on which type fluid is used in the service brake system. The driver control regulates the brake demand fluid pressure proportional to brake demand. The brake demand fluid pressure controls the retarder valve, the accumulator, and provides the apply pressure to the friction brake apply motor. In the brake off position, the outlet and inlet of the friction retarder unit are connected by the retarder valve to exhaust and the source, the torque converter outlet is connected through a cooler to the transmission lubrication system. Lubrication or mainline pressure is connected by the retarder valve to charge the accumulator. In the brake on positions, beginning at a minimum operating brake demand fluid pressure, brake demand fluid pressure moves the retarder valve to a minimum regulating position, discharges the accumulator to supply fluid through the retarder valve, which regulates and supplies the fluid at regulated pressure to the friction retarder unit inlet brake chamber, and acts on the friction brake apply motor in an apply direction to overcome the retraction springs for minimum, such as zero, torque braking. The discharge of the accumulator and switching movement of the retarder valve from brake off to brake on position occur quickly, as soon as there is a sufficient brake demand pressure signal to effect these operations, so fluid is supplied to the friction brake before it is initially applied. The initial flow through the brake plates for filling the retarder is quick and sufficient to lubricate and cool the brake plates for initial friction brake apply. Then the brake demand pressure operates on the brake apply motor to apply the friction brake to provide friction brake torque just prior to retarder torque. The delay, so cooling fluid reaches the brake plates before friction brake apply, may be provided by restriction of the brake apply feed, the volume of the brake apply motor chamber and the brake retraction springs, or by a pressure-responsive relay valve responsive to a pressure higher than that of the accumulator and retarder valve. With increasing brake demand pressure, regulated retarder inlet pressure increases, within the limit value increasing with speed in a low speed range, to increase retarder torque and decrease friction brake torque. The brake demand pressure acts on the accumulator to provide an accumulator discharge to the retarder inlet at a discharge pressure slightly higher than the regulated retarder inlet pressure to ensure accumulator discharge and retarder inlet flow to quickly fill the friction retarder unit and prevent charging the accumulator during brake operation. The friction brake provides an annular partition in the brake housing between the inner brake chamber and the retarder chamber, and the brake plate cooling grooves provide a restricted flow passage through the partition. The regulated retarder inlet fluid is connected to the inner brake chamber, flows radially outwardly through cooling passages or grooves in the brake plates, which preferably provide a constant restriction since the brake plates are engaged during all phases of brake application, to the retarder chamber and then to the retarder outlet line. The retarder inlet fluid at its regulated pressure in the inner brake chamber acts on the piston of the friction brake apply fluid motor for friction brake release. The retarder inlet fluid pressure is regulated in a low speed range to increase the speed limit pressure valve with increasing speed and to increase the pressure with increasing brake demand to the lower of the speed limit value and brake demand value and in the higher speed range to the brake demand value. The regulated retarder inlet fluid is supplied to the inner chamber in the friction retarder brake housing and due to the restriction of the flow passages, cooling grooves, in the brake plates, the pressure in the inner chamber is substantially retarder inlet regulated pressure which acts in a release direction on the friction brake motor to provide friction brake torque inversely proportional to brake demand, regulated retarder inlet pressure and retarder brake torque. The retarder fluid flows from the inner chamber through the flow passages in the brake plates to cool and lubricate the brake plates. These flow passages have sufficient flow capacity to meet retarder cooling flow requirements under regulated retarder inlet pressure with a low pressure drop. The retarder fluid flows through these flow passages to the inlet at the inner diameter of the retarder chamber. The retarder rotor during rotation pumps fluid in a toroidal flow path through the stator to provide hydrodynamic braking proportional to regulated retarder inlet pressure and provides higher pressure at the outer diameter of the retarder chamber for outlet flow through the retarder outlet which is connected by the retarder valve in the loop circuit through the cooler and returned to the retarder valve for regulation and supply to the retarder inlet. The retarder blades are at an angle to the axis—a forward angle relative to rotation on the rotor and an opposite aligned angle on the stator, and are streamlined to provide a high efficiency retarder, so retarder torque increases mainly in the straighter portion of the second power torque curve during the major portion of the speed range, low and intermediate speeds. In this retarder operating flow circuit, the combination of the constant retarder inlet fluid pressure proportional to brake demand, the pressure drop and flow volume through the flow or cooling passages in the brake plates and the pumping action increasing with increasing speed in the high speed range, reduces the volume of fluid in the retarder chamber with increasing speed to provide substantially constant brake torque or substantially moderately straight-line increasing brake torque with increasing speed.

These and other features of the invention will be more apparent from the following description and drawings, wherein:

FIG. 1 shows the arrangement of FIGS. 2a and 2b;

FIGS. 2a and 2b, when arranged as shown in FIG. 1, provide a schematic view of the transmission and brake system with the retarder valve in brake on position;

Figure 7:
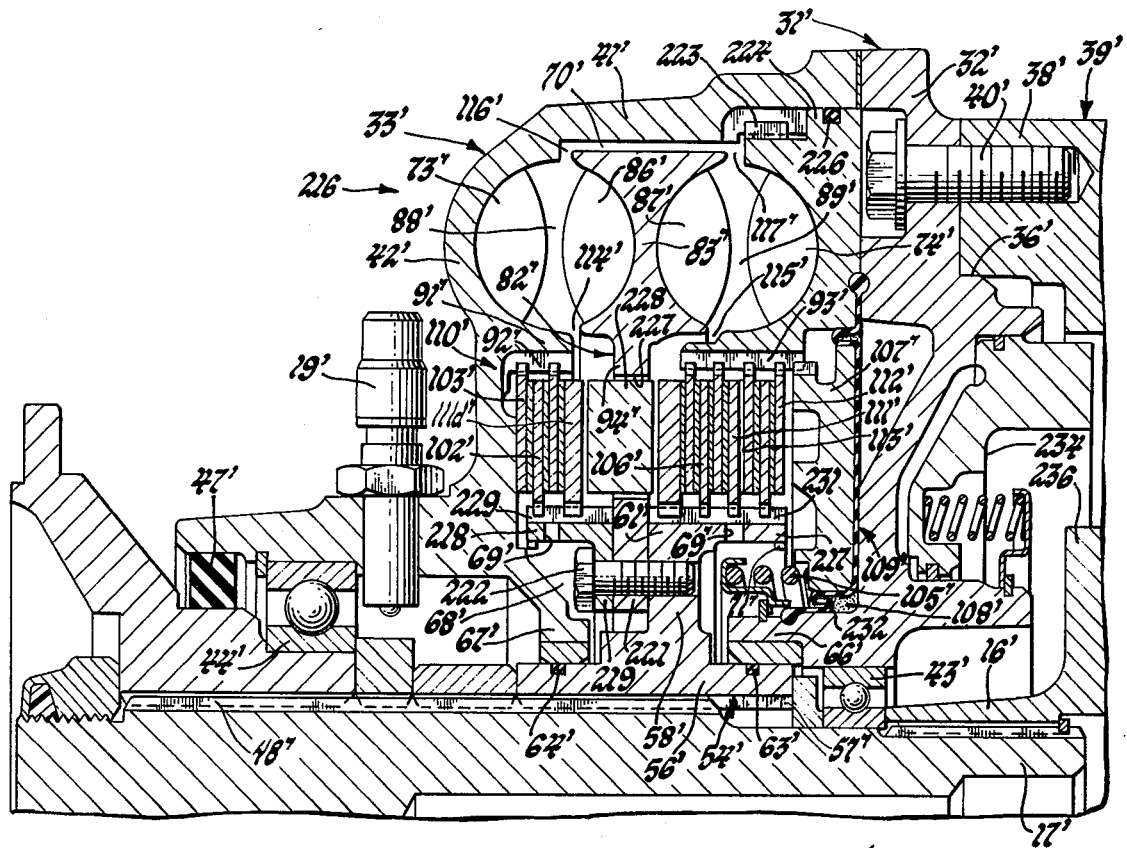
FIG. 7 shows a modified friction retarder unit.

The transmission and brake assembly 9 (FIG. 2a) has a brake unit 10 of the retarder friction type mounted at the rear of the transmission 11 which has an input shaft 12 drive connected by a torque converter 13 and a multiratio transmission drive 14 to transmission output shaft 16 which is drive connected to the brake shaft 17 providing the final output shaft of transmission and brake assembly 9. The transmission 11 is preferably a known automatic powershift multigear ratio transmission having a source 18 of regulated pressure fluid and a governor 19 driven by transmission output shaft 16, as shown e.g., in U.S. Pat. No. 3,691,872 Schaefer and Fox, patented Sept. 19, 1972, but other types of transmissions may be used. Governor 19 may also be driven by brake shaft 17, as shown in FIG. 7 and described below. Governor 19 provides a governor signal or pressure in governor pressure line 20 proportional to transmission output shaft or brake shaft speed for transmission controls 25 and retarder control 141. If the transmission used does not have a fluid source and a governor, these components, which are also used for control of brake unit 10, would be added to the transmission and brake assembly 9.

The known source 18 of high regulated pressure fluid is provided by a pump 21 driven by input shaft 12. Pump 21 draws fluid from sump 22 and delivers fluid to mainline 23 at a high pressure (e.g., 100 psi or higher) regulated by main regulator valve 24, and supplies transmission control 25 and retarder control 141. Main regulator valve 24 regultes mainline pressure and delivers first overage fluid to converter supply or inlet line 26 which is connected to supply fluid to torque converter 13 and second overage fluid to exhaust 30. Fluid flows through torque converter 13 to converter outlet line 27 to provide a source of fluid for brake unit 10, as described below. Converter supply line 26 and converter outlet line 27 respectively have relief regulating valves 28 and 29 to regulate converter supply pressure at an intermediate value, e.g., 32–52 psi, and converter outlet pressure at a lower value, e.g., 20–30 psi. Lubrication fluid and leakage from transmission 11 and leakage and exhaust fluid from transmission control 25 and retarder control 141 return to sump 22.

Figure 2B:
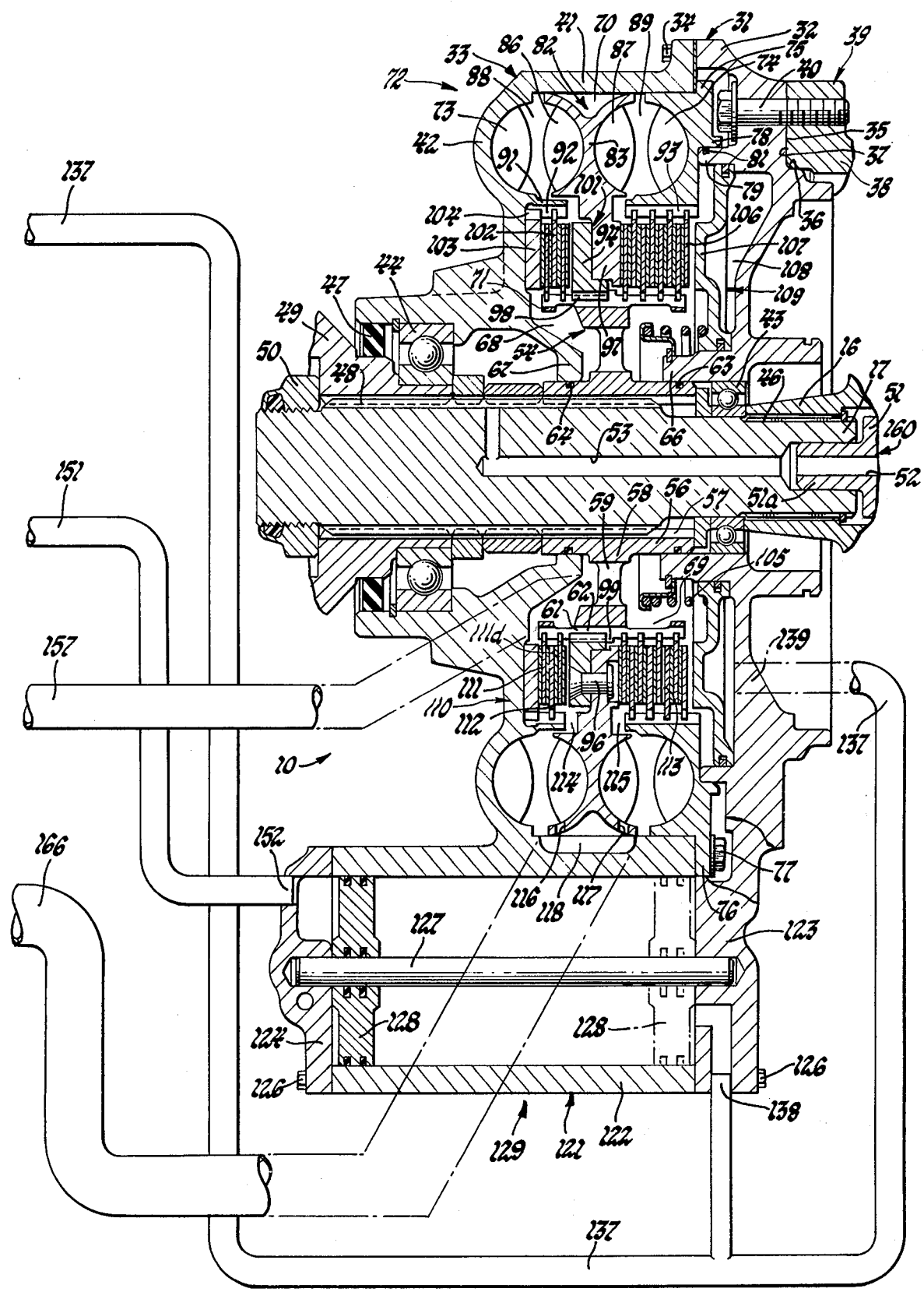

The brake unit 10, shown in detail in FIG. 2b, has a brake housing 31 having a front wall 32 and a cover member 33 secured together by fasteners or screws 34. Front wall 32 has a face 35 and a pilot flange and seat 36 respectively abutting and sealed to end face 37 and engaging the inner diameter of the barrel portion 38 of transmission housing 39 of transmission 11. Screws 40 secure and seal front wall 32 to barrel portion 38. Front wall 32 of brake unit 10 also provides the rear wall of transmission housing 39 and supports components of brake unit 10 and transmission 11, as further described below. Cover member 33 has a cylindrical or peripheral wall portion 41 and a rear wall 42. The front and rear walls or side walls and peripheral wall provide a closed housing having retarder chambers 88 and 89 and inner brake chamber 68. Brake shaft 17 is rotatably supported by front bearing 43 in front wall 32 and rear bearing 44 in rear wall 42. The connecting splines 46 provide the drive connection between the transmission output shaft 16, which in this transmission is the sleeve shaft portion of an output carrier, and brake shaft 17. A rear seal 47 to the rear of rear bearing 44 provides a seal between brake shaft 17 and rear wall 42 of brake housing 31. Brake shaft 17 has splines 48 to connect the brake shaft to the load, such as a vehicle propeller shaft and drive axle, as shown by connecting member 49 secured by lock nut 50. Transmission intermediate shaft 51 is rotatably supported in brake shaft 17 by bearing 51a and has a lubrication passage 52 which is supplied from lubrication line 159, described below, through a known transfer feed (not shown) in the transmission 11. Lubrication passage 52 is connected to lubrication passage 53 in brake shaft 17 for lubricant feed axially and radially to rear bearing 44. Lubricant is fed from lubrication passage 52 to conventionally lubricate transmission 11 and front bearing 43. A hub 54, located in housing 31, has an inner mounting sleeve 56 mounted on brake shaft 17 by drive connecting splines 57 on brake shaft 17 and sleeve 56 to provide a drive connection between brake shaft 17 and hub 54. Hub 54 has a web 58 with apertures 59 therein connecting sleeve 56 to the inner drum 61 which has external splines 62. Seals 63 and 64 on opposite ends of sleeve 56 have sealing engagement respectively with annular portions 66 and 67 on front wall 32 and rear wall 42 to seal inner brake chamber 68 of brake housing 31 to prevent leakage through bearings 43 and 44 between brake shaft 17 and walls 32 and 42 so that there is no leakage between brake chamber 68 and lubrication passages 52 and 53, or to sump 22. Inner drum 61 has a plurality of apertures 69 on each side of web 58 and an annular dam 71 at each end of drum 61 to collect and centrifugally supply retarder brake fluid to the brake plates 111 and 112 for lubrication and cooling and flow through grooves 113 to the retarder 72, as explained below with regard to the operation. The apertures 69 in FIG. 2b may be formed by an annular internal recess in inner drum 61 open to splines 62, so the spaces between the splines provide the apertues, or by drilled apertues 69' (FIG. 7). The total flow capacity of the apertures and grooves 113 is sufficient to meet full retarder cooling requirements under regulated retarder inlet pressure. The flow capacity of apertures 69 and grooves 113 on each side of rotor 82 is, in one form of the invention, proportional to the number of brake plates 111 and 112 on each side of rotor 82. In a modification, the flow capacity of the apertures 69 on each side of rotor 82 is equal.

Retarder 72 is located in an outer chamber 70 of brake housing 31 and has a first annular bladed stator member 73 formed as a portion of rear wall 42 at the outer diameter, and an oppositely facing second annular bladed stator member 74 having, at the outer diameter thereof, a flange 75 for sealing and ears 76 secured and sealed by screws 77 to cylindrical wall portion 41. Second stator member 74 has a seal step 78 adjacent a seal flange 79 on front wall 32 with an annular seal 81 therebetween. Rotor 82 has an outer bladed member 83 having first and second bladed portions 86 and 87 respectively facing first and second annular bladed stator members 73 and 74 to form first and second toroidal flow retarder chambers 88 and 89. First stator member 73, a portion of rear wall 42, has, just within first retarder chamber 88, a cylindrical flange 91 having internal splines 92. Second bladed stator member 74 has, just within second retarder chamber 89 and on its inner diameter, internal splines 93. Rotor 82 has a connecting portion 94 secured by rivets or bolts 96 to the inner portion 97 of outer bladed member 83. Connecting porton 94 has internal splnes 98 splined to external splines 62 on inner drum 61. Connecting portion 94 and inner portion 97 of rotor 82 form an intermediate plate 101 having opposite flat annular faces. A first group of brake plates 102 is located concentrically within first retarder chamber 88, between intermediate plate 101 and a backing plate 103 secured by external splines 104 to internal splines 92 of flange 91 on wall 42. A second group of brake plates 106 is located on the opposite side of intermediate plate 101, between intermediate plate 101 and piston 107, which is axially and reciprocally mounted and sealed in a cylinder 108 formed in front wall 32, of friction brake apply motor 109. The friction brake 110, having backing plate 103, first group of plates 102, intermediate plate 101, second group of plates 106, and brake apply motor 109, provides a partition between and dividing the brake housing 31 into inner inlet brake chamber 68 and outer chamber 70 having first and second retarder chambers 88 and 89. The plates of first and second plate groups 102 and 106 each have alternate plates 11 splined internally to external splines 62 on inner drum 61, and intermediate plates 112 externally splined respectively to internal splines 92 and 93 of first and second stator members 73 and 74. Alternate plates 111 are the faced plates and have radial and spiral cooling fluid-flow grooves 113 therein for fluid flow from inner brake chamber 68 to retarder chambers 88 and 89, as described below. The cooling grooves 113 in alternate brake plates 111 provide a substantially constant restricted passage for fluid flow through the above partition with the plates in contact.

The regulated retarder inlet pressure is supplied by retarder inlet line 157 to inner inlet brake chamber 68. Apertures 59 in web 58 provide for fluid flow through web 58 to fill chamber 68 on both sides of web 58 for fluid flow through apertures 69 in inner drum 61 on both sides of web 58 and through grooves 113 in both the first and second group of brake plates 102 and 106, respectively, to the first and second chamber inlets 114 and 115 to fill and flow through retarder chambers 88 and 89, through radial outlet ports 116 and 117 in the outer diameter portion of first and second bladed rotor portions 86 and 87, to the partial-annular outlet 118 connected to retarder outlet line 166.

The fluid accumulator 121 has a cylinder housing 122 formed integrally with cylindrical wall portion 41 of cover member 33 of brake housing 31, an end plate 123 formed integrally with front wall 32, and a separate end plate 124. End plates 123 and 124 are secured and sealed by screws 126 to cylindrical housing 122. A guide shaft 127 is centrally fixed to end plates 123 and 124. Piston 128 is slidably mounted and sealed to guide shaft 127 and in cylndrical housng 122. Fluid accumulator 121 has an operating port 138 and accumulator port 152 connected to the controls, as described below. Three (3) of these fluid accumulators 121 are used to provide a large fluid volume accumulator assembly 129 in a smaller diameter brake unit 10.

The brake unit control 130 may employ conventional types of vehicle brake pressure control systems. In FIG. 2a, a typical air pressure brake apply system is used having an air supply 131, providing constant regulated air pressure (e.g., 100 psi) to air supply line 132, which is connected to air accumulator 133 and to a conventional air brake regulator valve 134 operated by vehicle operator or driver pedal 136 to supply regulated brake demand air pressure to brake demand line 137. As driver pedal 136 is moved from brake OFF position to brake FULL-ON position, zero to maximum brake demand, the brake demand pressure proportionally increases, e.g., 0 to 100 psi. Brake demand line 137 is connected to apply cylinder 108 of friction brake apply motor 109, to operating port 138 of fluid accumulator 121 for discharge of the accumulator by brake demand pressure and charge of the accumulator when brake demand pressure is exhausted, and to the retarder valve 142 to bias retarder valve 142 of retarder control 141.

Retarder control 141 includes retarder valve 142, which provides switching and regulating, and a supply regulating valve 143. Retarder valve 142 has a main valve element 144 having equal diameter lands 144a, b, c, d, and e, in a bore 146. Brake demand line 137 is connected by port 145 to air chamber 147 in the end of bore 146 closed by cover 148 to act on the free end of land 144a to bias main valve element 144 from brake OFF position (FIG. 4) to brake ON and regulating position (FIG. 2a) to provide the pressure increasing bias force. Land 144a has annular seals 150, as shown, or a roll-form diaphragm (not shown) to provide a seal between air chamber 147 and the hydraulic portions of retarder valve 142.

Figure 4:
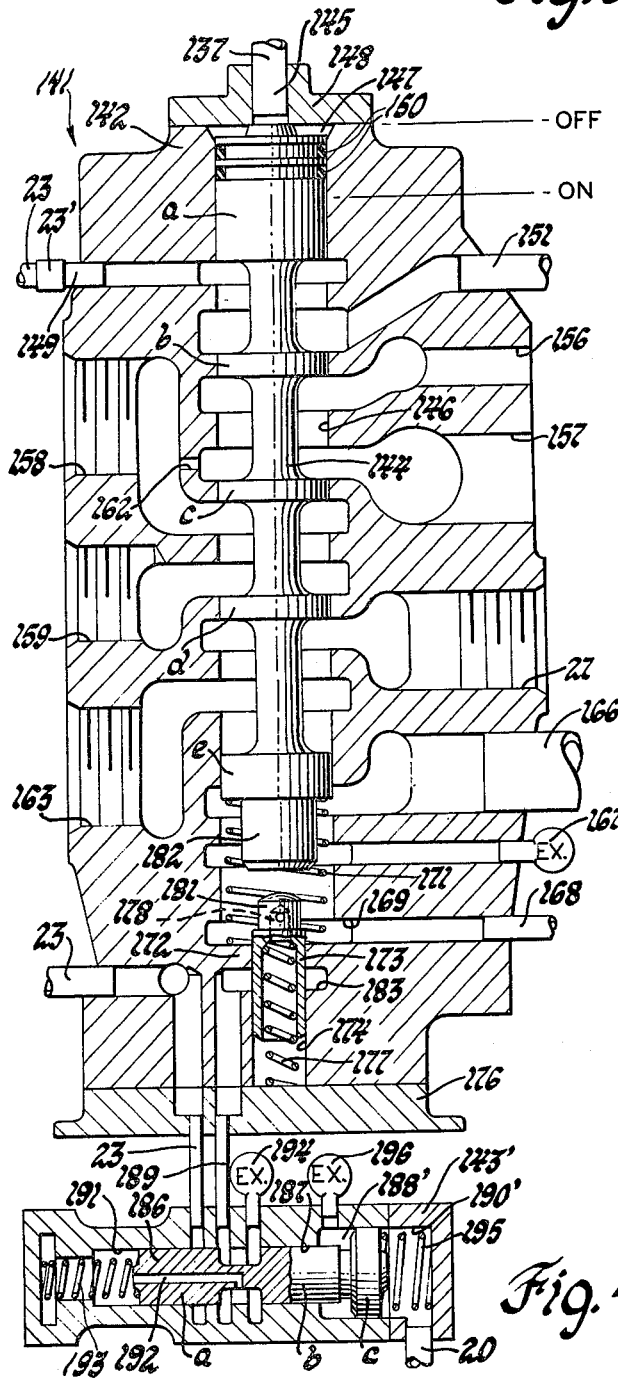
FIG. 4 shows a modification and the retarder valve of FIG. 2a in brake off position.

FIG. 4 shows a modification of the feed to accumulator supply line 149 controlled by retarder valve 142 and a modification of supply regulator valve 143. Such modifications are described below. FIG. 4 also shows retarder valve 142 in brake OFF position and is now used in conjunction with the following description of retarder control 141 and its retarder valve 142, shown in brake ON position (FIG. 2a), supply regulator valve 143 and brake unit control 130 shown in FIG. 2. When the lubrication line 159 provides sufficient pressure to charge the accumulator 121 under all operating conditions, the lubrication line branch 153 is connected through check valve 154 for one-way fluid flow to accumulator supply line 149 and by retarder valve 142 between lands 144a and b to accumulator line 151 in brake OFF position and blocked by land 144a in brake ON position. Accumulator line 151, in brake ON position, is connected to retarder inlet line branch 156 and retarder inlet line 157, and in brake OFF position is blocked, both between lands 144a and b. The cooler outlet line 158, in brake ON position, is connected between lands 144b and c to retarder inlet line 157 and in brake OFF position, is connected between lands 144c and d to lubrication line 159 which is connected to the transmission lubrication system which includes lubrication passages 52 and may have a pressure relief valve 161, located in the transmission, regulating lubricant pressure at a low value less than converter outlet pressure. In the brake OFF position, cooler outlet line 158 is connected by restriction 162 between lands 144b and c to retarder inlet line 157 to provide a low volume lubrication and coolng flow of fluid to the friction brake 110 and retarder 72. Converter outlet line 27, in the brake ON position, is connected between lands 144c and d to lubrication line 159, and in the brake OFF position, is connected between lands 144d and e to cooler inlet line 163 for flow through cooler 164, with a low pressure drop, to cooler outlet line 158. Retarder outlet line 166, in the brake ON position, is connected between lands 144d and e to cooler inlet line 163 and, in the brake OFF position, is connected beyond land 144e to exhaust port 167.

Retarder inlet line 157 has a regulating branch 168 connected to a regulating chamber 169 at the end of bore 146 so that regulated retarder inlet pressure acts on the free end area of land 144e in a pressure-decreasing direction, and excess pressure fluid is regulated to exhaust port 167. A first spring 171, seated between the end wall 172 of bore 146 and land 144e, also biases valve element 144 in a pressure-decreasng direction.

Retarder valve 142 also includes a regulating element 173, having a land a of smaller diameter than the lands of valve element 144, and being slidably mounted in a coaxial bore 174, connecting with larger bore 146 and closed at the opposite end by cover 176 and having a regulated pressure chamber 177. A central passage 178 in regulating element 173 connects regulated pressure chambers 169 and 177 so that regulated pressure acts on opposite ends of regulating element 173 so that it is a fluid pressure balanced valve element. A second spring 179, seated on cover 176, biases regulating element 173 so that abutment 181 on regulating element 173 engages a stop 182 on retarder valve element 144 in regulating brake ON position. Second spring 179 has a free height, so regulating element 173 only follows main valve element 144 during an initial portion of the movement of main valve element 144 from brake ON position (FIG. 2a) to brake OFF position (FIG. 4), but may have a higher free height and maintain light contact in brake OFF position. The distance between land 144e and land 173a is slightly larger, a little overlap, as compared to the distance between exhaust port 167 and supply port 183 to bore 174, for regulation to decrease regulated pressure by connecting chamber 169 to exhaust port 167, and to increase or decrease regulated pressure by connecting supply port 183 to chamber 169, depending on whether supply port 183 is supplied with fluid pressure or exhausted by regulator valve 143. Chamber 169 is connected to retarder inlet line branch 168 and retarder inlet line 157.

Supply regulator valve 143 has a regulator valve element 186 having equal diameter lands a and b slidable in small bore 187, and a larger diameter land c in larger bore 188 aligned with and connected to bore 187. The governor 19, driven by transmission output shaft 16 or brake shaft 17, which may be integral, delivers governor pressure proportional to the speed of the output or brake shaft, to governor line 20. Governor line 20 is connected to the transmission controls 25 and to governor chamber 190 at the closed end of large bore 188 to act on larger lens 186c to increase supply pressure by connecting mainline 23 to supply line 189 which is connected to supply port 183. Supply regulator valve 143 has a closed chamber 191 located at the opposite end of small bore 187 and connected at all times by central passage 192 in valve element 186 and the groove between lands 186a and b to supply line 189 to provide regulated supply pressure in closed chamber 191 and a spring 193, both biasing valve element 186 to decrease pressure by connecting supply line 189 to exhaust 194. The exhaust 196 vents the step between bores 187 and 188. Supply regulator valve 143 regulates the supply pressure in supply line 189 in a low speed range, from zero to a moderate speed (e.g., 0 to 800 RPM, or 0 to 18 MPH of a vehicle), from zero or a minimum to a maximum pressure value (e.g., 0 to 85 psi); and in the higher speed range, from a moderate speed to maximum speed (e.g., 800 to 2000 RPM), provides the maximum value or the higher full mainline pressure. The moderate speed is the lower speed at which the hydro retarder is able to provide maximum brake torque.

Figure 9:
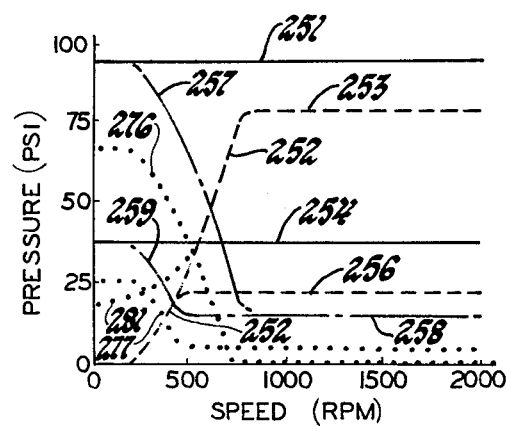
FIG. 9 shows pressure curves relative to speed.

The retarder control 141, in brake ON position, regulates retarder inlet pressure supplied to retarder inlet line 157 proportional, in the lower speed range, to the lower pressure value of a pressure value proportional to brake demand signal supplied by brake demand line 137, and a pressure value proportional to a governor speed signal supplied by governor line 20 and, in the higher speed range, to a pressure value proportional only to the brake demand signal. As shown in FIG. 9, in the higher speed range (e.g., 800 to 2000 RPM), retarder inlet pressure (dash line curve) has a constant intermediate value (curve 256) at intermediate brake demand and a constant maximum valve (curve 253) at maximum brake demand, showing that retarder inlet pressure increases directly in a near straight-line proportion to increasing brake demand. In the low speed range, retarder inlet pressure is regulated similarly in proportion to brake demand and further regulated or limited in proportion to retarder speed, so that if brake demand would provide a higher retarder inlet pressure, the retarder inlet pressure (curve 252) is limited to a value increasing with increasing retarder speed. Thus, in the low speed range, as the retarder inlet limit value (curve 252) increases in proportion to retarder speed, increasing brake demand will provide retarder inlet pressure at increasing values. The retarder inlet limit value is the same as the supply pressure in supply line 189 regulated by supply regulator valve 143 proportional to retarder speed.

Figure 3:
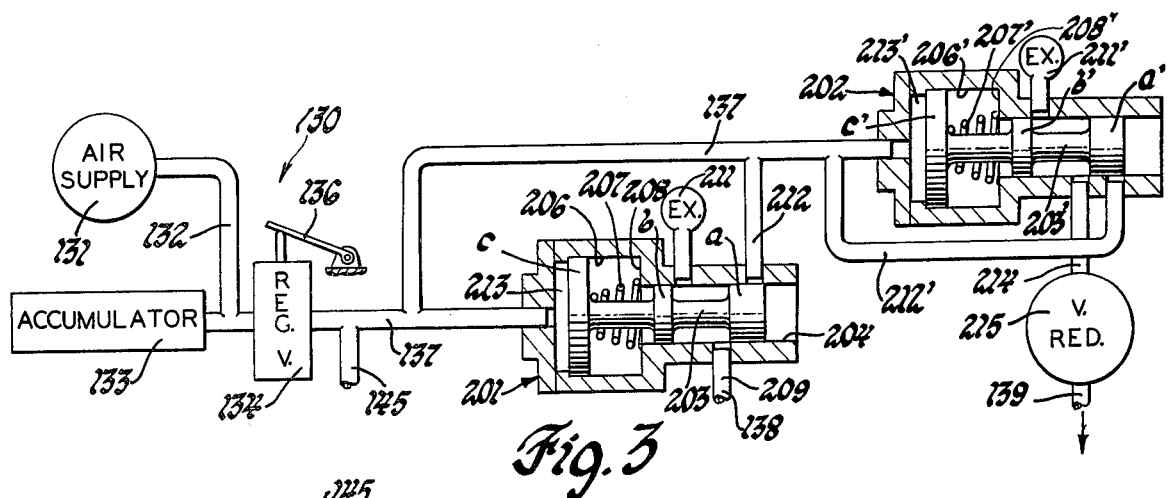
FIG. 3 is a partial schematic view showing a modification.

FIG. 3 shows a modified portion of the above-described FIG. 2 system to which reference is made for the other portions of the system. The FIG. 3 system shows, employing the same reference numerals for like parts, a regulated air supply 131 and accumulator 133 connected to air supply line 132 which is connected by air brake regulator valve 134 operated by driver pedal 136 to supply brake demand air pressure proportional to brake demand to brake demand line 137, as described above and shown in FIG. 2. Brake demand line 137 is similarly connected to port 145 of retarder valve 142. This system (FIG. 3) has a first relay valve 201 and a second relay valve 202 to time the operation respectively of discharge of accumulator 121 and apply of friction brake 110. First relay valve 201 has a valve element 203 having equal diameter lands a and b in a bore 204 and a larger land c in bore 206 and biased by spring 207 seated on step 208 between bores 204 and 206 and engaging large land 203c to bias valve element 203 to exhaust position connecting operating line 209, which is connected to operating port 138 of fluid accumulator 121 of FIGS. 3 and 2b between lands 203a and b to exhaust 211, and land 203a blocking brake demand line branch 212. When brake demand pressure, supplied by brake demand line 137 to chamber 213 in the end of bore 206 acts on large land 203c to overcome spring 207 to move valve element 203 to the open position, relay valve 201, in open position, connects brake demand line branch 212 between lands 203a and b, to operating line 209 and port 138 to discharge accumulator 121. Thus, relay valve 201 is used to time the initial supply of discharge pressure used to discharge the accumulator 121 substantially at the same time as, or only slightly before brake demand pressure increases to the value required to move the retarder valve 142 to the brake ON position for connecting accumulator 121 to the retarder inlet line 157.

The second relay valve 202 is similar to the first relay valve 201, so like reference numerals (primed) have been used, and reference is made to the above description. Second relay valve 202, in the closed position, blocks brake demand branch line 212' and connects friction brake apply line 214 to exhaust 211' and in the open position, connects brake demand branch line 212' to brake apply line 214, brake apply port 139, and brake motor 109 (FIG. 2b) to delay friction brake apply pressure until a predetermined brake demand pressure value is attained. Relay value 202 is used to delay initial apply of friction brake 110 until accumulator 121 begins to discharge fluid to the retarder inlet line 157 for cooling the friction plates 111 and 112 to provide brake cooling additional to that provided by lubrication flow through restriction 162 for cooling during initial apply of friction brake 110.

The friction brake apply line 214 has a pressure reduction or pressure ratio control valve 215 operative to provide friction brake apply pressure to brake apply port 139, having a predetermined pressure change ratio, decreasing or increasing relative to brake demand pressure. Conventional pressure reduction valves and pressure ratio control valves, such as Model 318 of Williams Air Control, Inc., Portland, Ore., are used. When a pressure reduction valve 215 is used, reducing brake apply pressure to a predetermined percentage (e.g., 67%) of brake demand pressure (curves 251, 254, FIG. 9), the modified net effective brake apply pressure is similarly reduced (dotted curve 276 at maximum brake demand and curve 277 at an intermediate brake demand). This arrangement provides modified net effective brake apply pressure, which, in the higher speed range, is lower at intermediate brake demand (dotted curve 277, FIG. 9) and very low or near zero at maximum torque demand (dotted curve 276) to reduce friction brake torque (dotted curve 279, FIG. 8) and wear at high speeds. Increased retarder torque may compensate for decreased friction brake torque. At and near zero speed, the modified net effective brake pressure and friction brake and total torque (dotted curves 279, 278, FIG. 8) are reduced for improved driver control.

FIG. 4 shows retarder control 141 in brake OFF position and two modifications, so like reference numerals are used, and reference is made to the above description of the basic FIGS. 2a and 4 retarder valve 142. In FIG. 4 mainline 23 is connected by connector 23' to accumulator supply line 149 instead of using the lubrication line branch 153, when the lubrication pressure of the transmission 11 is lower than desired for accumulator supply and charging. Also, the supply regulator valve 143' is modified. The same reference numrals have been used for like parts and reference is made to the above description of regulator valve 143. In supply regulator valve 143', governor chamber 190' has been enlarged and a second spring 195 has been added in governor chamber 190', acting with governor pressure on land 186c to increase regulated supply pressure in supply line 189. The diameter of land 186c and large bore 188' are also slightly reduced. Supply regulator valve 143' (FIG. 4) functions similarly to supply regulator valve 143 (FIG. 2a), but added second spring 195 provides a supply pressure which has a low value (e.g., 20 psi), at zero retarder speed, and increases at a lower rate at low speeds and then at about the same rate at higher speeds in the low speed range, as compared to the supply pressure provided by regulator valve 143. Thus, the retarder inlet pressure in line 157 is similarly limited to a low value (e.g., 20 psi) at zero speed, and increases with increasing speed in the low speed range to merge with and rise similarly to retarder inlet pressure provided by the FIG. 2a retarder control 141, as shown by dotted curve 281 (FIG. 9) showing this modified portion of the modified retarder inlet pressure relative to retarder inlet pressure curves 252 and 253. This increased retarder inlet pressure, at zero speed, reduces the net effective friction brake apply pressure and friction brake torque at zero speed.

FIG. 7 shows a modified friction hydro retarder brake unit 216 which is similar to the friction hydro retarder brake unit 10 shown in FIG. 2b and described above. Thus, like reference numerals (primed) have been used for similar parts, and reference to the above FIG. 2b description is made. The brake housing 31' has a front wall 32' and a cover member 33' secured and sealed together by fasteners (not shown). Cover member 33' has cylindrical wall portion 41' and rear wall 42'. Front wall 32' is similarly located on barrel portion 38' of transmission housing 39' by pilot flange and seat 36' on front wall 32' and secured and sealed together by screws 40'. Brake shaft 17' is rotatably supported by bearings 43' and 44' respectively in walls 32' and 42', and may have similar bearing lubrication passages (not shown). Hub 54' has an inner sleeve 56' drive connected by splines 57' to shaft 17', and a web 58' having apertures therein (not shown) for fluid passage though the web. Inner drum 61' has an integral portion 217 and a separate portion 218 with an attaching flange 219. The inner portion 221 of rotor 82' is secured between web 58' and attaching flange 219 by screws 222. The walls 32' and 42' have annular portions 66' and 67', which have annular steel inserts, as shown, if the walls are aluminum, radially adjacent sleeve 56', with seals 63' and 64' therebetween to provide the inner seal for inner brake chamber 68'. Each inner drum portion 217 and 218 has a plurality of apertures 69' formed therein. The retarder 72' has first and second annular bladed stator members 73' and 74'. Second stator member 74' is a separate member, connected by splines 223 to cylindrical wall portion 41' of brake housing 31' to prevent rotation, and has a locating flange 224 trapped between splines 223 and front wall 32' to prevent axial movement, and a seal 226 to cylindrical wall portion 41'. Rotor 82' has a bladed member 83' with first and second annular bladed rotor portions 86' and 87' repsectively facing first and second stator members 73' and 74' forming first and second toroidal retarder chambers 88' and 89'. Rear wall 42' or the first stator member 73' has a cylindrical flange 91' with internal splines 92' and second stator member 74' has internal splines 93' located just within retarder chambers 88' and 89'. Rotor 82' has a connecting portion 94' with an annular series of apertures 227, each having a thrust member 228 of cylindrical shape slidably mounted in each aperture 227. The thrust members 228 may contact each other or be otherwise sealed to minimize radial fluid flow, so the major radial cooling flow is through the grooves 113' in brake plates 111' and 112'. Friction brake 110' has a first group of plates 102' between thrust members 228 and a backing plate 103' formed separately or integrally with rear wall 42', with alternate plates 111' splined to splines 229 on separate drum portion 218, and intermediate plates 112' splined to internal splines 92', a second group of plates 106' between thrust members 228 and piston 107' in cylinder 108' of brake apply motor 109' with alternate plates 111' splined to splines 231 on integral portion 217 of drum 61', and intermediate plates 112' splined to internal splines 93' on second stator member 74' and brake apply motor 109'. Brake piston 107' may be sealed in cylinder 108' by roll-diaphragm 232. Retraction springs 105' return brake apply motor 109' to release the brake 110'. Brake 110' may similarly form a partition between inner chamber 68' and retarder chambers 88' and 89', and the plates 111' and 112' have cooling grooves 113' formed therein for some small restriction of coolant flow from inner chamber 68' through grooves 113' to inlets 114' and 115', through chambers 88' and 89' to outlet ports 116' and 117' for connection to an outlet line, such as line 166 (FIG. 2b). Front wall 32' also provides the rear wall of transmission housing 39' and may include ratio motor 234. The transmission output shaft 16' is shown as a portion of output carrier 236 of transmission gearing (not shown). Governor 19' may, as shown, be an electric governor providing an electric speed signal for the brake and transmission controls proportional to the speed of the brake shaft 17'.

Figure 5:
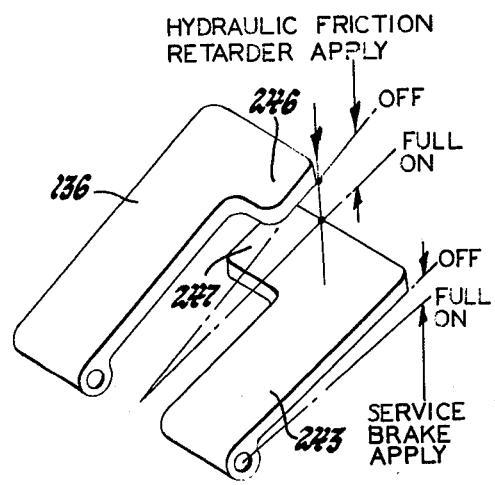
FIG. 5 shows a vehicle driver control.
Figure 6:
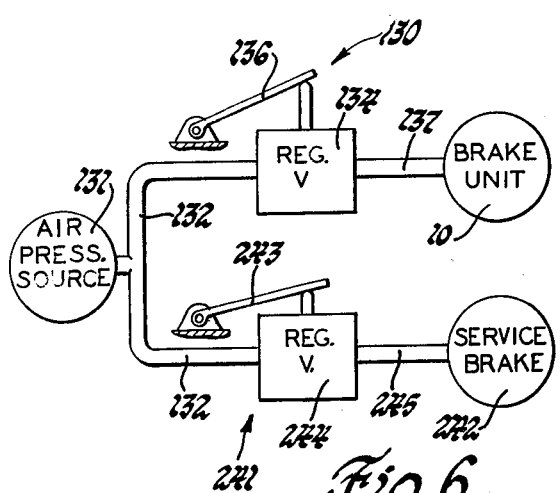
FIG. 6 is a schematic for the vehicle driver control and the vehicle and friction retarder brake unit.

A vehicle brake control 241 for providing joint control of the vehicle service brakes 242 and the friction retarder brake unit 10 is shown in FIGS. 5 and 6. The driver pedal controlled system is similar to the FIG. 2a system, so the same reference numerals have been used to designate air pressure source 131, which may have an accumulator (not shown) for supplying main regulated air pressure to air supply 132 connected to conventional air brake regulator valve 134. As driver pedal 136, conventionally pivotally mounted on a fixed pivot, is moved from brake OFF to FULL-ON position for increasing brake demand relative to brake unit 10, the driver pedal 136 controls regulator valve 134 to supply brake demand pressure increasing with brake demand to brake demand line 137 and brake unit 10. The service brake pedal 243, similarly pivoted, controls service brake regulator 244, which is supplied by air supply line 132 and supplies service brake demand pressure increasing with service brake demand through service brake apply line 245, to service brakes 242 to provide service brake torque increasing with service brake demand. The driver pedal 136 has an integral or added operating member 246 engaging operated member 247 on service brake pedal 243 in the brake unit FULL-ON position, so with continued movement, both pedals move from the service brake OFF position to the service brake FULL-ON position. During this continued movement, the regulator valve 134 provides lost-motion movement at maximum brake demand pressure. The driver pedal 136 may be operated only in the brake unit apply range, and the service brake pedal 243 may be independently operated, so the operator may selectively operate either the brake unit 10 or the service brakes 242. The regulator valve 134 and 244 have return springs (not shown) to return each pedal to its brake OFF position.

OPERATION

The operation of the brake system and the components thereof will now be summarized. When the driver or vehicle operator moves driver pedal 136 (FIGS. 2a, 3, and 6) from OFF position to FULL-ON position to increase brake demand to a maximum, on the friction hydro retarder brake unit 10, the brake regulator valve 134 is controlled to provide brake demand pressure for brake unit 10 increasing in proportion to brake demand in brake demand line 137. Further or continued movement of the driver pedal 136, or independent movement by the driver, moves service brake pedal 243 from OFF to FULL-ON position for increasing service brake demand to act on service brake regulator valve 244 to supply service brake pressure, increasing with brake demand, to service brake apply line 245 and service brakes 242 for proportionally increasing service brake torque.

The brake unit 10 is used with a conventional automatic powershift transmission 11 which provides a high fluid pressure source, mainline 23, a low fluid pressure source, converter outlet line 27, and an output or retarder speed governor pressure in line 20 for use in the transmission 11 and brake unit 10. The engine, when running, drives input pump 21 to supply fluid under pressure to mainline 23 which is regulated at a high pressure (e.g., 100 psi or higher) by main regulator valve 24 and connected to provide a regulated high fluid pressure source for transmission control 25 and retarder control 141. The regulator valve 24 connects first coverage to converter supply or inlet line 26 regulated by relief regulator valve 28 at an intermediate regulated pressure (e.g., 32 to 52 psi) to supply torque converter 13. The converter outlet line 27 is regulated by relief regulator valve 29 at a lower regulated pressure (e.g., 23 to 30 psi), and thus provides a regulated low fluid pressure source connected to the retarder control 141 for selective connection to cooler 164, transmission lubrication line 159, and fluid accumulator 121 of brake unit 10. The conventional transmission 11 is thus fully operative in response to driver control of transmission control 25 to drive the output and brake shafts 16 and 17 which are drive connected to a load, such as a vehicle drive. The brake unit 10 is also operative in response to driver control of driver pedal 136.

With the driver pedal 136 in brake OFF position, brake demand line 137 is exhausted or has zero air pressure, so apply cylinder 108 is exhausted to release brake apply motor 109 and friction brake 110; air chamber 147 is exhausted permitting spring 171 to move retarder valve element 144 of retarder valve 142 to the brake OFF position shown in FIG. 4; and operating port 138 of fluid accumulator 121 is exhausted permitting accumulator charging pressure to charge accumulator 121, moving piston 128 to the charged position shown by dot-dash lines in FIG. 2b. Retarder valve 142, in the brake OFF position, connects converter outlet line 27 between lands 144d and e to cooler inlet line 163 for flow through cooler 164 and cooler outlet line 158, which is connected between lands 144c and d to transmission lubrication line 159 to lubricate transmission 11. Retarder valve 142, in brake OFF position, connects both the retarder inlet line 157, via its branch 168, and retarder outlet line 166 to chamber 169 and exhaust port 167, so retarder pumping action will quickly evacuate inner brake chamber 68 and retarder chambers 88 and 89, so there is no retarder torque. Cooler outlet line 158 is also, in brake OFF position, connected through restriction 162 between the lands 144b and c to retarder inlet line 157 to inner brake chamber 68 to lubricate and cool friction brake 110; but there is insufficient volume of fluid flow for even a partial fill of retarder chambers 88 and 89, so there is no significant retarding. The overall effect of this very small lubricant flow to the brake unit 10 in brake OFF position is to reduce the total friction and retarder brake drag. Also, when the friction brake 110 and accumulator 121 are simultaneously supplied with brake demand fluid, this small lubricant flow is also sufficient to cool the friction brake during the few-tenths of a second required for accumulator discharge to supply fluid to cool the brake. The retarder valve 142, in brake OFF position, connects a source of regulated pressure fluid supplied to accumulator supply line 149 between lands 144a and b to the accumulator line 151 and port 152 to charge or fill accumulator 121, moving piston 128 from the discharged position (solid line) to the charged position (dot-dash line), FIG. 2b, and to maintain the accumulator charged when the brake unit 10 is in the OFF position. As shown in FIG. 2a, transmission lubrication line branch 153 is connected through one-way check valve 154 to accumulator supply line 149 to provide a lower regulated pressure source normally sufficient for rapid charging of accumulator 121. In the modification shown in FIG. 4, mainline 23 is connected to accumulator supply line 149 for very rapid charging of the accumulator 121.

To provide braking by brake unit 10, the driver moves driver pedal 136 from brake OFF position through positions of increasing brake demand to FULL- or maximum brake ON position to control air regulator valve 134 to supply regulated brake demand pressure increasing with brake demand (e.g., 0 to 100 psi). The conventional brake air regulator valve 134 resists driver control with a force proportional to brake demand for feel and returns pedal 136 to OFF position. At a predetermined low initial brake demand pressure (e.g., 15 psi), sufficient to move retarder valve 142 from brake OFF position to the brake ON regulating position, discharge of accumulator 121 at minimum retarder inlet pressure, and a light initial application of the friction brake 110, operation of brake unit 10 is initiated.

The low initial brake demand pressure, connected by brake demand line 137 and port 148 to chamber 147, moves retarder valve element 144 against first spring 171 and regulating element 173 against second spring 179, to the brake ON regulating position of retarder valve 142 shown in FIG. 2a. Retarder valve 142, on moving from the brake OFF position to the brake ON position, provides switching functions, changing the connections from the above-described brake OFF position connections to the following brake ON position connections. Converter outlet line 27 is connected between lands 144c and d directly to transmission lubrication line 159, thus by-passing cooler 164 so that full capacity of cooler 164 is available for retarder fluid cooling. The source of regulated pressure fluid for accumulator 121, whether from lubrication line branch 153 (FIG. 2a) or the modification from mainline 23 (FIG. 4), is blocked by land 144a, so accumulator 121 does not have a charging fluid supply. Accumulator line 151 is connected between lands 144a and b to retarder inlet branch 156 and line 157 to fill the loop circuit, including inner brake chamber 68 and retarder chambers 88 and 89. Retarder valve 142 establishes the loop circuit having in the order of fluid flow: retarder inlet line 157, inner brake chamber 68, grooves 113 in intermediate brake plates 112 providing a restricted passage through friction brake 110, retarder chambers 88 and 89 where the fluid is pumped through retarder outlet line 166, between lands 144d and e, cooler inlet line 163, cooler 164, cooler outlet line 158, and between lands 144b and c to retarder inlet line 157 to complete the loop circuit. Retarder inlet line 157 is connected by its regulating branch 168 to regulating chamber 169 fo regulation by retarder valve 142, due to the combined regulating action of valve element 144 and regulating element 173. Retarder inlet pressure in regulating branch 168, retarder inlet line 157, and inner chamber 68 is regulated at a pressure (e.g., 0 to 85 psi), increasing in proportion to brake demand pressure and brake demand up to a limit value (e.g., 0 to 85 psi) proportional to increasing speed in a low speed range (e.g., 0 to 800 RPM) of brake shaft 17 which, in a usual heavy road vehicle would be a low speed range (e.g., 0 to 18 mph). In the retarder pressure regulating position of retarder valve 142 (FIG. 2a), brake demand pressure in air chamber 147 biases valve element 144 and regulating element 173 in a pressure-increasing direction. The pressure-decreasing bias force is provided by regulated retarder inlet pressure in regulating chamber 169 acting on the full area of land 144e, first spring 171 acting directly on valve element 144, and second spring 179 acting through regulating element 173 on valve element 144. The central passage 178 through regulating element 173 provides balanced pressure on both ends of regulating element 173 so that it does not provide a fluid pressure bias force. Supply regulator valve 143 is supplied from a source of high regulated fluid pressure, mainline 23, and is controlled in response to governor pressure provided by governor line 20 to regulate supply pressure in supply line 189 and port 183 at a supply pressure (e.g., 0 to 85 psi), increasing from zero at zero speed in proportion to speed in a low speed range (e.g., 0 to 800 RPM), to the maximum value at the highest speed in the low speed range, and remaining at the maximum value, equal to the maximum retarder inlet pressure or further increasing to a higher mainline pressure in the higher speed range. When, in both the low and high speed ranges, retarder inlet pressure in line 157 exceeds the regulated value proportional only to brake demand pressure on land 144a, retarder inlet pressure acts through its regulating branch 168 and chamber 169 on land 144e to open exhaust 167 to exhaust retarder inlet fluid through exhaust 167 to sump 22 and regulating element 173 due to the bias force of second spring 179 follows, remaining in contact with valve element 144, to close supply port 183. When, in the low speed range, retarder inlet pressure in line 157 exceeds the regulated value proportional only to supply pressure and speed, the excess fluid exhausts past land 173a to supply port 183 and line 189 and is connected by supply regulator valve 143 to exhaust 194. Regulated retarder inlet pressure, in the low speed range, is equal to the lower of the pressure value proportional to brake demand and the pressure value proportional to speed, the supply pressure. Thus, the regulated retarder inlet pressure is proportional to brake demand and limited in the low speed range to a value increasing with increasing speed. When, in both the low and high speed range, retarder inlet pressure in line 157 and regulating chamber 169 is less than the regulated value, valve element land 144e closes exhaust port 167 and moves regulating element 173 to open supply port 183 to supply additional supply fluid at a speed-responsive regulated pressure to chamber 169 to increase retarder inlet pressure in retarder inlet line 157. When, in the low speed range, decreasing speed calls for a reduction of regulated retarder inlet pressure below the value proportional to torque demand, retarder inlet pressure is exhausted through supply port 183 and supply line 189 and supply regulator valve 143 to exhaust 194. The above regulation, especially for retarder inlet pressure decrease in response to decreasing speed, requires valve overlap, slightly greater spacing between lands 144e and 173a than between exhaust port 167 and supply port 183, or a small leakage from the retarder loop circuit which may occur at valves or some seals.

As shown in FIG. 9, retarder inlet pressure dash line curves), increases with increasing speed in the low speed range portion 252 and has a constant value in the higher speed range which is proportional to brake demand pressure, a maximum value (curve 253) at maximum brake demand and an intermediate value (curve 256) at an intermediate brake demand. At constant maximum brake demand pressure (curve 251), maximum retarder inlet pressure increases on curve 252 in proportion to governor pressure and speed in the low speed range, up to maximum retarder inlet pressure (curve 253), and continues at maximum constant retarder inlet pressure (curve 253) in the higher speed range. At lower brake demand pressures, such as intermediate brake demand pressure (curve 254), the retarder inlet pressure similarly increases on curve 252 with speed, in a low speed range having a lower maximum speed, up to a lower retarder inlet pressure (curve 256), reduced proportionally with brake demand pressure, and in the higher speed range continues at intermediate constant retarder inlet pressure (curve 256).

The brake demand line 137 is connected by operating port 138 to accumulator cylinder 125 to act on piston 128 which will remain in the charged (dot-dash line) position shown in FIG. 2b when retarder valve 142 in brake OFF position supplies accumulator line 151. When retarder valve 142 shifts from brake OFF to accumulator discharge position or brake ON position, the brake demand pressure moves piston 128 to the discharged position (solid lines), quickly supplying fluid by accumulator line 151 and retarder valve 142 at an accumulator discharge pressure equal to brake demand pressure to quickly fill the retarder loop circuit, especially inner brake chamber 68 and then retarder chambers 88 and 89. Since, as shown in FIG. 9, retarder valve 142 always regulates retarder inlet pressure at a value lower than brake demand pressure, so the accumulator is quickly discharged and held discharged. The retarder valve may, on moving from brake OFF position, first reach accumulator discharge position and then regulating brake ON position, to provide initial fluid supply for friction brake cooling before or at initial friction brake apply. In the FIG. 3 modification, the relay valve 201 delays the supply of brake demand pressure to accumulator 121, so retarder valve 142 shifts to accumulator discharge or brake ON position and the accumulator is pressurized and begins discharging at the same time. The three accumulators having the same structure and fluid connections, function as the single accumulator shown to provide a brake unit having a smaller envelope. Brake demand line 137, through brake apply port 139, supplies brake demand pressure to cylinder 108 to act on piston 107 in an apply direction to apply brake apply motor 109 and friction brake 110. In the preferred arrangement, brake demand pressure initially acts on the apply motor 109 and, at the predetermined low pressure (e.g., 15 psi), initiates discharge of accumulator 121 to quickly supply cooling fluid to the brake plates 111 and 112 during the initial low torque brake engagement. The brake demand line 137 to brake apply motor 109 may have a restriction (not shown) and with a large volume cylinder 108 with piston 107 in brake OFF position and the retraction springs 105, there is a delay so retarder inlet fluid is flowing through cooling grooves or passages 113 in brake plates 112 before initial application of friction brake 110. The regulated retarder inlet pressure, after the accumulator is discharged to fill inner brake chamber 68, quickly reaches its regulated pressure value in inner brake chamber 68 and acts on piston 107 in a release direction opposing the brake demand pressure in cylinder 108 to provide with increasing speed a net effective apply pressure. Maximum brake demand provides maximum net effective brake apply pressure (dot-dash curve 257, FIG. 9), which, after the initial rise of net effective apply pressure, in the low speed range decreases from maximum constant brake demand pressure (curve 251) to a low value inversely relative to increasing retarder inlet pressure (curve 252), and has a constant low value (dot-dash curve 258) in the higher speed range. At intermediate brake demand pressure (curve 254), the net effective apply pressure (curve 276) decreases from the intermediate brake demand pressure (curve 254) to the same constant net effective apply pressure (dot-dash curve 258). The friction brake torque, at maximum brake demand (dot-dash curve 261), is thus at zero speed maximum and equal to total brake torque (solid line curve 263), decreases with increasing speed in the low speed range to a constant low or minimum value. At lower brake demand values, the friction brake torque is proportionally lower (e.g., intermediate brake torque, dot-dash curve 262), and decreases in a smaller low speed range to the same constant higher speed friction brake torque. Initial brake torque has a value proportional to brake demand.

With increasing speed, the regulated retarder inlet pressure in line 157 is regulated at increasing pressure values on curve 252, FIG. 9, proportional to speed in the low speed range and increases up to the brake demand regulated retarder inlet pressure which has a maximum constant value (curve 253) at maximum brake demand and proportionally lower values (curve 256) at lower brake demand values. The regulated retarder inlet pressure is supplied by retarder inlet line 157 to inner inlet brake chamber 68 to act on brake apply motor 109 in a release direction, as pointed out above, and for flow through the cooling grooves 113 which provide the flow passages through brake plates 111 and 112 of friction brake 110, to the retarder chambers 88 and 89. Grooves 113 have a total flow capacity at the regulated retarder inlet pressure in brake chamber 68 to meet total friction brake and retarder cooling requirements in all phases of operation of brake unit 10 with a small or minimal pressure drop. The retarder bladed member 83 on rotor 82 has first and second annular bladed rotor portions 86 and 87 circulating the fluid in a toroidal flow path respectively through the first and second annular bladed stator members 73 and 74 to provide hydrodynamic retarder braking and to pump fluid from the first and second retarder chamber inlets 114 and 115 through outlet ports 116 and 117 to annular outlet 118 and retarder outlet line 166 at a pressure value higher than the retarder regulated inlet pressure value for flow through the loop circuit having cooler 164, which has a pressure drop. Additional fluid is required for regulation of retarder inlet pressure and is supplied by mainline 23, supply regulator valve 143, supply line 189 and regulating element 173 to regulating chamber 169, branch 168 and retarder inlet line 157. Since retarder 72 has high efficiency and capacity, the retarder brake torque in a large or major lower portion of the full speed range provides, at a constant regulated retarder inlet pressure, retarder torque on the moderately rising initial straight-line portion of the typical second power hydrodynamic retarder torque curve. In the high or near-maximum speed range, the combination of the substantially constant regulated retarder inlet pressure (curve 253) and the constant restriction of the cooling grooves 113 in the flow path to the retarder chambers 88 and 89, and the increased pumping action of the retarder 72, increasing at a higher rate in proportion to speed in the high speed portion on a second power curve, reduces the degree of fill of the retarder chambers to provide maximum retarder torque at constant retarder inlet pressure, increasing moderately in a substantially straight line with increasing speed, as shown by maximum retarder torque (dash-line curve 266, FIG. 8. Similarly, at reduced brake demand and retarder inlet pressure (curve 256), retarder torque is proportionally reduced and has a similar relation to speed, as shown by intermediate retarder torque dash-line curve 267. As retarder inlet pressure is reduced (curve 252), in the low speed range, retarder torque is proportionally reduced (dash-line curve 268). The sum or total of the friction brake torque (curve 261) and retarder torque (curve 268-266), equals the total brake torque (curve 263), which initially at zero speed has a maximum value, and with increasing speed, moderately decreases in the low speed range, and then moderately increases in a substantially straight-line relation to increasing speed to a higher value. The torque curves at lower brake demand values are proportionally reduced and similar, intermediate retarder torque curve 268-267, friction brake torque curve 262, and brake demand total torque curve 264.

Figure 8:
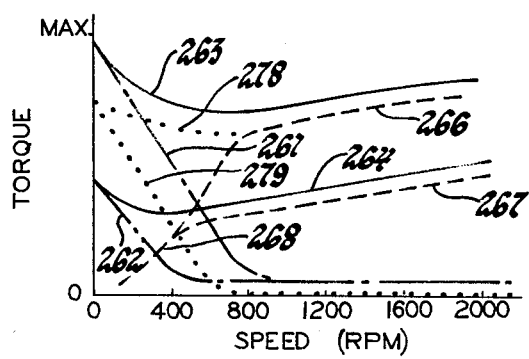
FIG. 8 shows the brake torque curves relative to speed.
Figure 10:
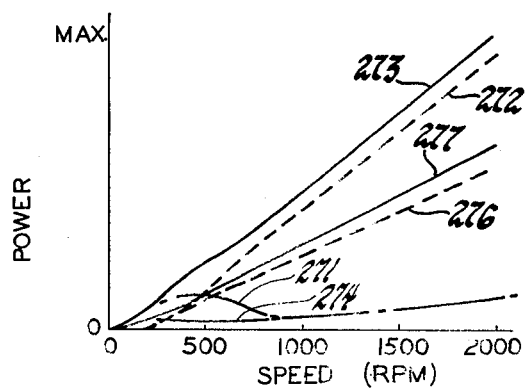
FIG. 10 shows brake power curves relative to speed.

The brake power curves, FIG. 10, are plotted from the torque curves of FIG. 8. The sum of the maximum friction brake power (dot-dash curve 271), plus maximum retarder brake power (dash-line curve 272), equals the total power (solid line curve 273). For intermediate brake demand, the power curves for friction brake power (curve 274) is similar, and retarder power (curve 276) and total power (curve 277) are similar and at lower power.

The transient characteristics of the preferred FIG. 2 brake system for initial maximum brake demand operation at a constant speed in the higher speed range are now described in terms of the time lag periods from zero time, the time at which movement of pedal 136 is initiated. The characteristic values are now described relative to time. Brake demand air pressure in line 137 begins to rise substantially at zero time and rises in substantially a straight line in a short time lag period, e.g., 0.35 sec., due to pedal movement and air compressibility, to maximum brake demand pressure. The retarder inlet pressure in retarder inlet line 157 and in chamber 68 is controlled in the following stages. In the first stage, the retarder inlet pressure is zero for a very short time lag period (e.g., 0.1 sec.), then in a second stage, rises at a high rate, as the supply regulator valve 143 feeds mainline pressure fluid through the retarder valve 142 and the accumulator 121 discharges to supply fluid to the loop circuit, to about two-thirds of regulated maximum retarder inlet pressure when the accumulator is empty in a longer time lag period, e.g., 0.5 sec. or 0.6 sec., from zero time. Then in a third stage, retarder inlet pressure rises at a low rate, as only the supply regulator valve 143 feeds pressure fluid, to maximum regulated retarder pressure in a longer time period, 1.8 or 2.4 secs. from zero time. The net effective friction brake pressure on brake apply motor 109 is the brake demand pressure minus the retarder inlet pressure and the small retraction spring force, and changes in the following stages. In a first stage, such net effective pressure rises at almost as high a rate as brake demand pressure to a maximum value, about 15-20% less than maximum brake demand pressure, in a very short time lag period, e.g., 0.35 sec. Then in a second stage, such net effective pressure decreases about 20-25% at a high rate as retarder inlet pressure continues to rise at a high rate in a short time lag period, e.g., 0.3 sec. Then in a third stage, such net effective pressure decreases at a low rate, as retarder inlet pressure in its third stage increase at a low rate, to a minimum value, about 20-25%. The friction brake torque varies similarly to the net effective friction brake pressure but with a small time lag (e.g., 0.1 sec.), so the peak at maximum torque is rounded and has a small time lag (e.g., 0.4-0.5 sec.), and the torque decreases smoothly on a straighter line than net effective pressure to the minimum value torque, e.g., 20-25% of maximum. The hydraulic torque increases very slowly as the accumulators empty and then after the accumulators are empty, at a higher substantially constant rate to maximum retarder torque as regulated retarder inlet pressure reaches the maximum value. The total brake torque, the sum of friction and hydraulic brake torque reaches 75% of maximum in a very small time period, e.g., 0.35 sec., and maximum in a short time period, e.g., 0.5-0.6 sec. At lower brake demand, the above characteristic values are proportionally reduced. The above characteristics are described relative to time and without reference to speed. With decreasing speed in the low speed range, retarder inlet pressure and torque are reduced, and net effective brake pressure and friction brake pressure are increased, as explained above and shown in FIGS. 8 and 9. In the preferred embodiment, the torque increases proportional to increasing retarder inlet pressure in a smooth curve, close to a straight line, with a slightly higher rate of increase at low pressures changing to a slightly lower rate of increase at high pressures.

The change in operation provided by each of the modifications shown in FIGS. 3 and 4 will now be described. The other portions of the above-described brake system may remain the same. One or more of these modifications may be used. The first relay valve 201 is used to delay the supply of brake demand pressure in brake demand line 137 to operating port 138 of fluid accumulator 121 for discharging the accumulator until brake demand pressure rises nearly to, or to the low value required to shift the retarder valve element 144, so the accumulator places the accumulator fluid under pressure substantially simultaneously with shift movement of retarder valve 142. First relay valve 201 may also connect a regulated pressure equal to maximum brake demand pressure for a higher accumulator discharge rate at low brake demand. The second relay valve 202 provides a modification for delaying the supply of brake demand pressure to brake apply motor 109, preferably until the brake demand pressure rises to the pressure value that shifts the retarder valve 142, or a little higher, so the retarder valve 142 is shifted to brake ON position and retarder inlet fluid is supplied to chamber 68 and the friction brake 110 for cooling and reducing the brake apply force or providing a lower net effective pressure on initial engagement. The pressure reduction or pressure ratio change valve 215 in the brake demand line 137 to the brake apply port 139 of brake apply motor 109 is a modification employed to change the relation between the friction brake apply pressure, and thus the net effective brake pressure, and the retarder inlet pressure. Both pressures will continue to vary in proportion to brake demand. When a pressure reduction valve 215 is employed, the brake apply pressure is reduced relative to brake demand pressure, and the net effective friction brake apply pressure is proportionally reduced (curve 276, FIG. 9), for maximum brake demand and curve 277 for intermediate brake demand. This modification reduces friction brake torque in the higher speed range to a lower value, or zero, so the friction brake torque and wear are reduced to a lower value or to substantially zero in the higher speed range. This also reduces friction braking and total braking near and at zero speed for smoothly bringing the vehicle to a stop. In constructions where the friction brake 110 requires a higher apply pressure to provide the preferred or modified relation between friction brake torque and retarder torque, the brake demand pressure is increased by a pressure ratio change valve 215, also connected to air supply line 132, to provide a proportionally increased brake apply pressure.

In FIG. 4 a modification is shown in which mainline 23 is connected to accumulator supply line 149 to provide a higher pressure than lubrication pressure for charging the accumulator. The mainline 23 portion connected to accumulator supply line 149 may be provided with a conventional priority valve such as valve 392 of the above-mentioned U.S. Pat. No. 3,691,872, so transmission operating requirements have priority over accumulator charging requirements.

Also, in FIG. 4, the supply regulator valve 143' is modified by adding second spring 195 and reducing the area of land 186c relative to the area of land 186a to modify supply pressure in supply line 189, to have a low value at zero speed, to increase at a low rate and then a higher rate with increasing speed in the low speed range to a high value at the highest speed in the low speed range. The modified supply pressure varies like curve 281 (FIG. 9) relative to speed and provides or limits retarder inlet pressure to the values on curve 281 at maximum brake demand. As in both the preferred embodiments and this modification, if the retarder valve 142 regulation operation, in response to brake demand pressure, would regulate a higher retarder inlet pressure than supply pressure, such higher retarder inlet pressure will not be provided in the low speed range because the supply pressure limits retarder inlet pressure; but if the brake demand pressure would regulate, in response to brake demand pressure, a lower retarder inlet pressure than supply pressure, such lower retarder inlet pressure will be provided. This increase of retarder inlet pressure at very low-to-zero speed, as compared to the preferred embodiment will decrease the net effective friction brake apply pressure and brake torque at low-to-zero speeds in the low speed range for smoother vehicle stopping and will not materially increase retarder torque.

In the rotor 82, the bladed member 83 is aluminum to reduce rotational inertia and connecting portion 94, hub 54, and shaft 17 are steel, so these portions have durable splines for transmitting brake torque. In the first and second groups of brake plates 102 and 106, a dead plate 111d contacts the intermediate plate 101, a portion of rotor 82, so intermediate plate 101 does not require the high degree of flatness required by brake plates, so rivets 96 may be located in this area, and so only hydrodynamic brake torque is transmitted by connecting portion 94 and splines 98 and 62 to hub 54, and all friction brake torque is independently transmitted by alternate plates 111, including 111d, to splines 62 and hub 54. In FIG. 2b dead plate 111d has the same construction as alternate plates 111, while in FIG. 7 dead plate 111d is thicker, for bridging between thrust members 228, and has a facing engaging the adjacent steel plate 112'. In FIG. 7, piston 107' has an external spline engaging internal spline 93' to prevent rotation. The pistons 107' (FIG. 7) and 107 (FIG. 2b) may have such or other means to prevent rotation. The radial cooling flow grooves 113 are in the alternate plates 111 which rotate with hub 54 and rotor 82, so fluid flow through the restricted flow passage provided by grooves 113 is assisted by centrifugal force during rotation. The restricted flow passage through the brake includes grooves 113, apertures 69, and axial flow passages provided by splines 92 and 93. The apertures 59, the axial flow passages, and the inlets 114 and 115 have a flow-equalized effect for equalizing the flow through plate groups 102 and 106 and retarder chambers 88 and 89. Release spring 105 releases apply motor 109 and friction brake 110 when cylinder 108 is exhausted. All the components of friction brake 110 are annular to form an annular fluid partition. The lubrication line 159 and relief valve 161, and lubrication passage 52 supplied thereby, are parts of a conventional transmission system 160 serving to lubricate the transmission 11, the gearing, and friction ratio engaging devices.

In the low speed range, regulator valve 143 regulates the supply pressure in line 189 and limits the hydrodynamic brake inlet pressure in line 157 to decreasing pressure values as speed decreases, to decrease the hydrodynamic brake inlet pressure in the same relation as the maximum capacity hydrodynamic brake torque decreases with decreasing speed, (Curve 268), when the inlet pressure is maximum—or at least sufficient to maintain the hydrodynamic brake chambers filled. The hydrodynamic brake inlet pressure, while being reduced with decreasing speed, is always the pressure required to keep the hydrodynamic brake chambers filled. Thus in the low speed range, retarder or hydrodynamic brake inlet pressure has a stable directly proportional relation to hydrodynamic brake torque and is used to proportionally increase friction brake torque as speed decreases.

It will be appreciated that other modifications of the invention may be made.

We claim:

1. In a brake assembly: hydrodynamic brake means having a bladed stator and a bladed rotor forming a brake chamber with an inlet and an outlet operative during rotation of said rotor with fluid in said brake chamber to pump fluid from said inlet and said outlet and provide hydrodynamic brake torque; a source of fluid under pressure having a regulated pressure varying with the speed of said rotor; an exhaust; brake control means connected to said inlet, said source and said exhaust and including brake demand signal means providing a brake demand signal operative in brake off position to connect said inlet to said exhaust, and in the brake on position to connect said outlet to said inlet and to regulate the fluid pressure supplied to said inlet by selectively connecting said inlet to said exhaust and connecting said source to said inlet to regulate the pressure in said inlet and said brake chamber proportional to said brake demand signal from said brake demand signal means at pressure values up to the regulated pressure of said source varying with the speed of said rotor.

2. In a brake assembly: hydrodynamic brake means having a bladed stator and a bladed rotor forming a brake chamber with an inlet and an outlet operative during rotation of said rotor with fluid in said brake chamber to pump fluid from said inlet to said outlet and provide hydrodynamic brake torque; a loop circuit passage connecting said outlet to said inlet; a source of fluid under pressure having a regulated pressure varying with the speed of said rotor; an exhaust; brake control means interconnecting said loop circuit passage, said source and said exhaust and including brake demand signal means providing a brake demand signal operative in a brake off position to connect said loop circuit passage to said exhaust, and in the brake on position to regulate the fluid pressure in said loop circuit passage by selectively connecting said loop circuit passage to said exhaust and connecting said source to said loop circuit passage to regulate the pressure in said loop circuit passage and said brake chamber proportional to said brake demand signal from said brake demand signal means at pressure values up to the regulated pressure of said source varying with the speed of said rotor.

3. The invention defined in claim 2, and said source providing a regulated pressure increasing with speed in a low speed range at a predetermined substantially constant rate to a maximum value and a pressure at or above said maximum value at higher speeds, and said hydrodynamic brake means in said low speed range providing increasing torque at a substantially constant maximum rate in response to increasing speed and said regulated pressure of said source increasing at substantially the same rate as required to keep said brake chamber of said hydrodynamic brake means filled to provide increasing torque and increasing regulated pressure in a predetermined stable proportion with speed in the low speed range.

4. The invention defined in claim 2, and a cooler in said loop circuit passage having a small pressure drop and dividing said loop circuit passage into an outlet passage portion connecting said outlet to said cooler and an inlet passage portion connecting said cooler to said inlet; said brake control means having a connection to said inlet passage portion to provide regulated inlet passage fluid pressure and a restricted flow passage in said inlet passage portion between said connection and said inlet having a small pressure drop to provide hydrodynamic brake torque having a substantially straight-line relation to increasing speed of said rotor.

5. The invention defined in claim 4, and a housing having side walls and a housing chamber with an outer chamber portion and an inner chamber portion providing a part of said inlet passage portion between said connection and said restricted flow passage, said hydrodynamic brake means being in said outer chamber portion; friction brake means located between said side walls and providing a fluid partition between said outer chamber portion and said inner chamber portion and having a plate connected to said housing, a plate drive connected to said bladed rotor, said restricted flow passage including cooling grooves in one of said plates; a fluid motor operative in response to apply pressure to apply said friction brake means and to regulate inlet passage fluid pressure in said inner chamber portion to release said friction brake means, and said brake control means providing brake apply pressure proportional to brake demand to said fluid motor to apply said friction brake means and said regulated inlet fluid pressure acting on said fluid motor to reduce friction brake torque in proportion to said regulated inlet fluid pressure and hydrodynamic brake torque.

6. In a brake assembly; a stationary housing having side walls and providing a housing chamber; shaft means rotatably mounted in said housing; hydrodynamic brake means in said housing chamber having a stator fixed in said housing and having an annular bladed stator portion; rotor means mounted for rotation with said shaft means and including axially movable means mounted for axial movement relative to said shaft means, and an annular bladed rotor portion located adjacent to and facing said bladed stator portion and forming between said bladed stator portion and said bladed rotor portion an annular hydrodynamic brake chamber; friction brake means located in said housing chamber concentrically within said hydrodynamic brake means and having a backing plate on one side wall, a cylinder on the other side wall, a piston in said cylinder facing said backing plate, said axially movable means being located between said backing plate and said piston, first friction means located between said backing plate and said axially movable means, second friction means located between said axially movable means and said piston, and control means connected to supply fluid under pressure to said hydrodynamic brake means to provide hydrodynamic braking and to supply fluid under pressure to said cylinder to move said piston to engage said second friction means and axially move said axially movable means to engage said first friction means for engaging movement of said friction brake means for providing friction brake torque.

7. The invention defined in claim 6, and said first and second friction means each including a dead plate contacting said axially movable means and drive connected independent of said rotor means to said shaft means and axially movable relative to said shaft means so hydrodynamic and friction brake torque are independently transferred to said shaft means.

8. The invention defined in claim 6, and said annular bladed rotor portion being axially and rotatably fixed to said shaft means and said axially movable means being mounted on said annular bladed rotor portion for axial movement relative to and for rotation with said annular bladed rotor portion.

9. The invention defined in claim 6, and said axially movable means and said annular bladed rotor portion of said rotor means being mounted for joint axial movement relative to said shaft means and for joint rotary movement with said shaft means.

10. The invention defined in claim 9, and said rotor means having clearance for a limited degree of axial movement relative to said bladed stator portion and said housing; said first friction means limiting said axial movement of said rotor means within said limited degree of clearance during said engaging movement of said friction brake means, and stop means on said shaft means for limiting said axial movement of said rotor means within said limited degree of clearance during disengaging movement of said friction brake means.

11. In a brake assembly: a stationary housing having side walls and providing a housing having an outer chamber with an outlet port and an inner chamber with an inlet port; a shaft rotatably mounted in said housing; a cooler; an outlet line connecting said outlet port to said cooler; an inlet line connecting said cooler to said inlet port; hydrodynamic brake means in said outer chamber having a stator fixed in said housing and having an annular bladed stator portion; rotor means mounted on said shaft for rotation with said shaft and having an annular bladed rotor portion located adjacent and facing said bladed stator portion and forming between said bladed stator portion and said bladed rotor portion an annular hydrodynamic brake chamber having an intake port and a delivery port, and pumping fluid from said intake port to said delivery port for flow through said outlet line, cooler, and inlet line to said inlet port; friction brake means in said housing concentrically within said bladed stator and rotor portions and providing a partition between said outer and inner chambers and having a backing plate on one side wall, a cylinder on the other side wall, a piston in said cylinder facing said backing plate, said rotor means having a transfer portion concentrically within said rotor and stator bladed portions located between said backing plate and said piston; a group of annular friction plates located between said backing plate and said piston and including said transfer portion and having alternate plates splined to said housing and intermediate plates drive connected to said shaft; cooling passages extending radially through some of said friction plates from the inner diameter to the outer diameter of said friction plates for fluid flow from said inner chamber through said friction plates to said intake port; control means operative to supply fluid at a regulated fluid pressure proportional to brake demand to said cylinder and to supply fluid at a regulated fluid pressure having a lower value proportional to brake demand to said inlet line and inner chamber to apply a release force on said piston and for fluid flow through said cooling passages to said hydrodynamic brake chamber.

12. In a brake assembly: hydrodynamic brake means having a bladed stator and a bladed rotor forming a brake chamber with an inlet and an outlet operative during rotation of said rotor with fluid in said brake chamber to pump fluid from said inlet to said outlet and to provide hydrodynamic brake torque; a loop circuit passage connecting said outlet to said inlet; accumulator means having a port and operative on the supply of fluid under pressure to said port to charge said accumulator means and on connecting said port to a lower pressure to discharge said accumulator means; a source of fluid under pressure; an exhaust; brake control means interconnecting said port of said accumulator means, said loop circuit passage, said source and said exhaust and including brake demand signal means providing a brake demand signal operative in a brake off position to connect said source to said port and block the connection of said port to said loop circuit passage and to connect said loop circuit passage to said exhaust, and in the brake on position to block the connection of said source to said port and connect said port to said loop circuit passage to discharge said accumulator means into said loop circuit passage and said brake chamber, and to regulate the fluid pressure in said loop circuit passage by selectively connecting said loop circuit passage to said exhaust and connecting said source to said loop circuit passage to regulate the pressure in said loop circuit passage and said brake chamber proportional to said brake demand signal from said brake demand signal means.

13. The invention defined in claim 12, and a cooler in said loop circuit passage having a small pressure drop and dividing said loop circuit passage into an outlet passage portion connecting said outlet to said cooler and an inlet passage portion connecting said cooler to said inlet, said brake control means being connected to said inlet passage portion of said loop circuit passage to provide regulated inlet passage fluid pressure.

14. The invention defined in claim 13, and said hydrodynamic brake means including a housing having side walls and a housing chamber with inner and outer chamber portions; said bladed stator fixed to said housing and said bladed rotor rotatably mounted in said housing in said outer chamber portion of said housing chamber; annular means concentrically within said bladed stator and bladed rotor forming a partition between said side walls and between said outer chamber portion and said inner chamber portion of said housing chamber and having fluid flow passages connecting said inner chamber portion of said inlet to said brake chamber in said outer chamber portion for providing the fluid flow requirements of said hydrodynamic brake means and a small pressure drop to provide regulated inlet passage pressure in said inner chamber portion and said inlet passage being connected to said inner chamber portion.

15. The invention defined in claim 14, and a shaft rotatably mounted centrally in said inner chamber portion on said housing; a connecting rotor drive connecting said bladed rotor to said shaft; said annular means being friction brake means having a plate connected to said housing, a plate drive connected to said connecting rotor, cooling grooves in said plates providing said flow passages; a portion of said connecting rotor for connecting said bladed rotor through said friction brake means to said shaft, and a fluid motor having an apply chamber, a piston responsive to fluid apply pressure to apply said friction brake means, and responsive to said regulated inlet passage fluid pressure in said inner chamber portion and between said plates to release said friction brake means; and said brake control means providing an apply pressure proportional to said brake demand signal and having a higher value than the value of said regulated inlet passage fluid pressure at the same brake demand value to provide a net effective brake apply pressure to apply said friction brake means with torque decreasing with increasing regulated inlet passage fluid pressure and the torque of said hydrodynamic brake means increasing at a moderate substantially constant rate with increasing speed of said bladed rotor at constant inlet passage fluid pressure.

16. In a transmission and brake assembly: an automatic powershift transmission having an input, an output, a torque converter and multiratio fluid-operated gearing drive connecting said input to said output; a lubrication system and controls including a governor providing a governor signal proportional to output speed; a main source providing regulated high pressure fluid, shift controls controlling the supply of said main source in response to said governor signal to said gearing for automatic ratio shifting; a converter inlet source supplying pressure fluid to said torque converter, and said torque converter providing a converter outlet source of fluid pressure; a hydrodynamic brake having a rotor drive connected to said output, a stator, and a brake chamber having a brake inlet and a brake outlet; a cooler; accumulator means having a port and operative on the supply of fluid under pressure to said port to charge said accumulator means and operative on connecting said port to a lower pressure to discharge said accumulator means; an exhaust; brake control means having a regulation chamber and brake demand means providing a brake demand signal and being connected to at least one of said sources, said brake inlet and outlet, said cooler, said exhaust and said governor, and operative in a brake off position to connect said converter outlet source through said cooler to said lubrication system, to connect one of said sources to supply said port and to block the connection of said port to said brake inlet and to connect said brake inlet and outlet to said exhaust, and operative in a brake on position to connect said port to said brake inlet, to block the connection of said one of said sources to said port, to connect said converter outlet source directly to said lubrication system, to connect said brake outlet through said cooler to said regulation chamber and to supply fluid to said brake inlet and to regulate the pressure in said regulation chamber and supplied to said brake inlet in response to said brake demand signal and said governor signal to regulate the pressure of the fluid supplied to said brake inlet at increasing pressure values with increasing brake demand within the limits of increasing pressure limit values increasing with increasing output speed.

17. The invention defined in claim 16, and said brake control means operative in brake off position connecting said converter outlet source to said port, and operative in brake on position to block the connection of said converter outlet source to said port, and having a speed pressure source responsive to said governor signal providing a regulated source pressure proportional to output speed and selectively connecting said regulation chamber to exhaust and to said speed pressure source to regulate the pressure of the fluid supplied to said brake inlet.

18. In a brake assembly: a stationary housing having side walls and providing a housing chamber; a shaft rotatably mounted in said housing; a hub secured to said shaft and located in said housing; hydrodynamic brake means in said housing chamber having a stator fixed in said housing having oppositely facing annular bladed stator portions; a rotor mounted on said hub for rotation with said hub and shaft and for axial movement relative to said hub and having oppositely facing annular bladed rotor portions located between said bladed stator portions with sufficient clearance for a limited degree of axial movement, and forming between each adjacent bladed stator portion and bladed rotor portion an annular hydrodynamic brake chamber; friction brake means in said housing chamber concentrically within said bladed stator portions and said bladed rotor portions and having a backing plate on one side wall, a cylinder on the other side wall and a piston in said cylinder facing said backing plate, said rotor having a transfer plate portion concentrically within said annular bladed rotor portions located between said backing plate and said piston; a first group of annular friction plates located between said backing plate and said rotor transfer plate portion; a second group of annular friction plates located between said rotor transfer plate portion and said piston, each group of plates having alternate plates splined to said housing and intermediate plates splined to said hub; said first group of friction plates in engaged position limiting movement of said transfer plate portion and rotor in one direction within said limited degree of axial movement of said rotor; and stop means on said hub limiting movement of said transfer plate portion in the opposite direction within said limited degree of axial movement of said rotor.

19. The invention defined in claim 18, and said first and second groups of annular friction plates including a dead plate contacting said transfer plate portion and splined to said hub so hydrodynamic brake torque and friction brake torque are independently transferred to said hub.

20. The invention defined in claim 18, and said friction brake means providing a fluid partition between said side walls dividing said housing chamber into an outer chamber containing said hydrodynamic brake means and an inner chamber concentrically within said friction brake means; said hydrodynamic brake chambers having an inlet at the inner diameter and an outlet at the outer diameter, and said bladed rotor portions pumping fluid in an exponential proportion to speed from said inlet to said outlet; said intermediate plates having cooling grooves extending from the inner diameter to the outer diameter providing a restricted flow passage through said friction brake means and having sufficient flow capacity for cooling said friction brake means and said hydrodynamic brake means with a small pressure drop; a cooler with a small pressure drop; an outlet passage connecting said outlet to said cooler; an inlet passage connecting said cooler to said inner chamber; control means connected to said cylinder to supply fluid at a regulated apply pressure proportional to brake demand and connected to said inlet passage to supply fluid at a regulated inlet pressure proportional to speed and brake demand in a low speed range and proportional to brake demand in a higher speed range for flow to and regulated inlet pressure acting on said piston to provide friction brake torque proportional to the excess of apply pressure over inlet pressure and for flow through said restricted flow passage and inlet to said brake chamber for pumping to said outlet, outlet passage and cooler, and providing hydrodynamic brake torque increasing and friction brake torque decreasing with speed and torque demand in a low speed range and high hydrodynamic brake torque and low friction brake torque proportional to brake demand and varying in a substantially straight-line relation to speed in the higher speed range.

21. In a brake assembly: hydrodynamic brake means having a bladed stator and a bladed rotor forming a brake chamber, and operative during rotation of said rotor with fluid in said brake chamber to provide hydrodynamic brake torque; brake demand means providing a brake demand signal proportional to brake demand; a source of fluid under pressure having a regulated pressure; an exhaust; brake control means connected to said brake chamber, said source and said exhaust for regulating and supplying regulated brake pressure to said brake chamber and having a first spring and a first valve element biased to brake off position by said first spring and said regulated brake pressure, and biased to brake on position by said brake demand signal, and having a second spring and a second valve element biased to contact and move with said first valve element in the brake on position and unaffected by said regulated brake pressure, and operative in brake off position to connect said brake chamber to said exhaust, and in the brake on position to supply and regulate the fluid pressure in said brake chamber by said first valve element selectively connecting said brake chamber to said exhaust, and said second valve element selectively connecting said source to said brake chamber to regulate the pressure in said brake chamber proportional to said brake demand signal from said brake demand means at pressure values up to the regulated pressure of said source.

22. The invention defined in claim 21, and governor means providing a governor signal proportional to rotor speed, and said source of fluid pressure being regulated in response to said governor signal in proportion to rotor speed.

23. The invention defined in claim 22, and said source of fluid pressure increasing in a low speed range with rotor speed at pressure values controlling hydrodynamic brake torque for a stable increase with increasing rotor speed up to the maximum regulated brake pressure in a low speed range, and to permit maximum regulated brake pressure at higher speeds to limit the increase of regulated brake pressure and brake torque in response to brake demand in said low speed range, and to permit maximum regulated brake pressure and brake torque in response to brake demand at higher speeds.

24. In a brake assembly; hydrodynamic brake means having a stator, a rotor and blading on such stator and said rotor forming a brake chamber with an inlet and outlet operative during rotation of said rotor in a low speed range with said brake chamber substantially filled with fluid to provide substantially maximum capacity hydrodynamic brake torque increasing with speed; friction brake means operatively connected to said rotor and having a fluid actuator to apply said friction brake means to provide friction brake torque; and brake control means providing a brake demand signal proportional to brake demand to said fluid actuator to provide and apply force on said friction brake means and providing a hydrodynamic brake fluid supply at a pressure proportional to said maximum capacity hydrodynamic brake torque to said inlet to substantially fill said brake chamber and to said fluid actuator to release said friction brake means to reduce friction brake torque as hydrodynamic brake torque increases.

* * * * *